(12) United States Patent
Hatakeyama et al.

(10) Patent No.: US 6,698,895 B2
(45) Date of Patent: Mar. 2, 2004

(54) PROJECTION IMAGE DISPLAY

(75) Inventors: Atsushi Hatakeyama, Osaka (JP); Shigekazu Yamagishi, Osaka (JP); Shu Namba, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/343,411

(22) PCT Filed: Jun. 21, 2002

(86) PCT No.: PCT/JP02/06205
§ 371 (c)(1),
(2), (4) Date: Jan. 28, 2003

(87) PCT Pub. No.: WO03/005122
PCT Pub. Date: Jan. 16, 2003

(65) Prior Publication Data
US 2003/0142277 A1 Jul. 31, 2003

(30) Foreign Application Priority Data
Jul. 2, 2001 (JP) ........................................ 2001-200569

(51) Int. Cl.⁷ ............................................... G03B 21/14
(52) U.S. Cl. ........................................... 353/31; 353/34
(58) Field of Search .............................. 353/31, 34, 37; 349/5, 7, 8; 359/204, 216, 217

(56) References Cited

U.S. PATENT DOCUMENTS 6,491,396 B2 * 12/2002 Karasawa et al. ............ 353/20
6,493,149 B2 * 12/2002 Ouchi ........................ 359/634
6,508,554 B2 * 1/2003 Hatakeyama et al. ......... 353/31
6,511,184 B2 * 1/2003 Yamagishi et al. ........... 353/31
6,568,811 B2 * 5/2003 Noda et al. ................... 353/31

FOREIGN PATENT DOCUMENTS

| EP | 0 492 721 | 7/1992 |
| EP | 1 193 531 | 4/2002 |
| JP | 4-316296 | 11/1992 |
| JP | 2000-111941 | 4/2000 |

* cited by examiner

*Primary Examiner*—William Dowling
(74) *Attorney, Agent, or Firm*—Merchant & Gould, P.C.

(57) ABSTRACT

A white light beam from a light source portion (201) is separated into respective light beams of red, green and blue by a color separation optical system (204). The respective light beams are reflected by a rotating polygon mirror (207), travel via a second optical system (210) and form belt-like illuminated regions on an image display panel (212). By a rotation of the rotating polygon mirror (207), the illuminated regions of the respective light beams move continuously, and each pixel of the image display panel (212) is driven by a signal corresponding to a color of light entering this pixel. An image on the image display panel (212) is magnified and projected onto a screen by a projection optical system (216). The color separation optical system (204) has first and second reflecting mirrors that respectively reflect the respective light beams of red, green and blue, and these reflecting mirrors are arranged so that optical paths of the respective light beams have equal lengths from the light source portion (201) to the rotating polygon mirror (207). This makes it possible to provide a small projection-type image display apparatus that has a high efficiency of light utilization and can display an image with high resolution and enhanced color uniformity.

9 Claims, 7 Drawing Sheets

PROJECTION IMAGE DISPLAY

TECHNICAL FIELD

The present invention relates to a projection-type image display apparatus that displays a color image with one light valve serving as a modulating member.

BACKGROUND ART

A liquid crystal projector that now is the mainstream in the market of large-screen displays uses a light source lamp, a focusing lens and a projection lens to magnify and form an image of a liquid crystal panel (a light valve) onto a screen. Current commercial systems can be classified roughly into a three-plate system and a single-plate system.

In the former system of the three-plate liquid crystal projector, after a light beam from a white light source is separated into light beams of three primary colors of red, green and blue by a color separation optical system, these light beams are modulated by three monochrome liquid crystal panels so as to form images of the three primary colors. Thereafter, these images are combined by a color combination optical system so as to be projected onto a screen by one projection lens. Since the entire spectrum of the white light from the light source can be utilized, this system has a high efficiency of light utilization. However, because of the necessity of the three liquid crystal panels, the color separation optical system, the color combination optical system and a convergence adjusting mechanism between the liquid crystal panels, this system is relatively expensive.

On the other hand, a conventional single-plate system liquid crystal projector is compact and inexpensive because an image formed on a liquid crystal panel having a mosaic color filter simply is magnified and projected onto a screen. However, since this system obtains light with a desired color by absorbing light with an unwanted color out of white light from the light source by means of the color filter serving as a color selection member, only one-third or less of the white light that has entered the liquid crystal panel is transmitted (or reflected). Accordingly, the efficiency of light utilization is low and high-brightness images cannot be obtained easily. When the light source is brightened, the brightness of the displayed image can be improved. However, there remain problems of heat generation and light resistance owing to light absorption by the color filter, making it very difficult to increase the brightness.

A single-plate system that improves the efficiency of light utilization is suggested in JP 4(1992)-316296 A. FIG. 8 shows a schematic configuration of this image display apparatus.

A white light beam emitted from a light source portion 100 is led to a color separation optical system 101. As shown in FIG. 9, the color separation optical system 101 includes dichroic mirrors 121a and 121b and two reflection mirrors 121c and 121d. The dichroic mirror 121a reflects blue light and transmits green light and red light. The dichroic mirror 121b reflects red light and transmits green light and blue light. These dichroic mirrors 121a and 121b are crossed. A blue light beam 132 out of a white light beam 131 from the light source portion 100 is reflected by the dichroic mirror 121a, reflected by the reflection mirror 121d and passes through an aperture 102B of a field stop 102. A red light beam 133 is reflected by the dichroic mirror 121b, reflected by the reflection mirror 121c and passes through an aperture 102R of the field stop 102. A green light beam 134 is transmitted by both the dichroic mirrors 121a and 121b and passes through an aperture 102G of the field stop 102. The apertures 102R, 102G and 102B of the field stop 102 are formed like a belt (a rectangle), and the light beams of red, green and blue are emitted adjacent to each other from these apertures.

As shown in FIG. 8, the belt-like light beams of respective colors emitted from the field stop 102 pass through a scanning optical system 105, then illuminate different regions of a single transmission-type light valve (a display panel) 104 in a belt-like manner. With an effect of a rotating prism 103 constituting the scanning optical system 105, the belt-like light beams of red, green and blue scan the light valve 104 from the bottom to the top. When a belt-like illuminated region of one of the light beams goes beyond the uppermost end of an effective region of the light valve 104, the belt-like illuminated region of this light beam appears at the lowermost end of the effective region of the light valve 104 again. In this manner, the light beams of red, green and blue can scan over the entire effective region of the light valve 104 continuously. A light beam illuminating each row on the light valve 104 varies moment by moment, and a light valve driving device (not shown in this figure) drives each pixel by an information signal according to the color of the light beam that is illuminated. This means that each row of the light valve 104 is driven three times for every field of a video signal to be displayed. A driving signal inputted to each row is a color signal corresponding to the light beam illuminating this row among signals of the image to be displayed. The light beams of these colors that have been modulated by the light valve 104 are magnified and projected onto a screen (not shown in this figure) by a projection lens 106.

With the above configuration, the light beam from the white light source is separated into light beams of three primary colors, so that the light from the light source can be used with substantially no loss and the efficiency of light utilization can be increased. Also, since each of the pixels on the light valve displays red, green and blue sequentially, a convergence adjusting mechanism between the liquid crystal panels as in the three-plate system is not necessary, and therefore, it is possible to provide a high quality image.

However, in the above configuration, the light beams of these colors from the field stop 102 are not converged when transmitted by the rotating prism 103. Since the size (the radius of gyration) of the rotating prism 103 has to be in accordance with a region illuminated by the light beam emitted from the field stop 102, the rotating prism 103 becomes large and heavy. This has made it difficult to reduce the size and weight of the apparatus. Furthermore, a powerful motor for rotating the rotating prism 103 becomes necessary, causing an increase in the size and cost of the apparatus.

Moreover, with the above-described configuration of the color separation optical system 101, the lengths of optical paths of the light beams of individual colors from the light source portion 100 to the light valve 104 are not equal. Thus, it is impossible to focus all the light beams at a pupil position of the projection lens 106. As a result, the light quantity of the light beam focused at the pupil position and the light quantity of the light beam focused at a position shifted from the pupil position are different on the screen, resulting in poor color uniformity in the displayed image.

DISCLOSURE OF INVENTION

It is an object of the present invention to solve the above-described problems of the conventional image display apparatus and to provide a small projection-type image display apparatus that is provided with a scanning optical system for scanning an illuminated portion (a light valve) sequentially with light beams of individual colors and has enhanced color uniformity in a displayed image.

In order to achieve the above-mentioned object, a projection-type image display apparatus of the present invention includes a light source portion for emitting a white light beam; a first optical system, which includes a white illumination optical system that the white light beam from the light source portion enters and that emits a uniform white illumination light beam having a rectangular cross-section, a color separation optical system for separating the white illumination light beam into respective light beams of red, green and blue, and a relay lens system that the respective light beams obtained by a color separation enter; a rotating polygon mirror that the respective light beams having left the relay lens system enter and that scans the respective light beams while reflecting the respective light beams; a second optical system for leading the respective light beams reflected by the rotating polygon mirror to an illumination position; an image display panel that is arranged at the illumination position and provided with many pixels for modulating an incident light according to a color signal of red, green or blue; an image display panel driving circuit for driving each of the pixels of the image display panel by a signal corresponding to a color of light entering this pixel; and a projection optical system for magnifying and projecting an image of the image display panel. Here, the color separation optical system includes first and second red-reflecting mirrors that reflect at least the red light beam, first and second green-reflecting mirrors that reflect at least the green light beam, and first and second blue-reflecting mirrors that reflect at least the blue light beam. The mirrors are arranged so that optical paths of the respective light beams have equal lengths from the light source portion to the rotating polygon mirror.

BEST MODE FOR CARRYING OUT THE INVENTION

Figure 1:
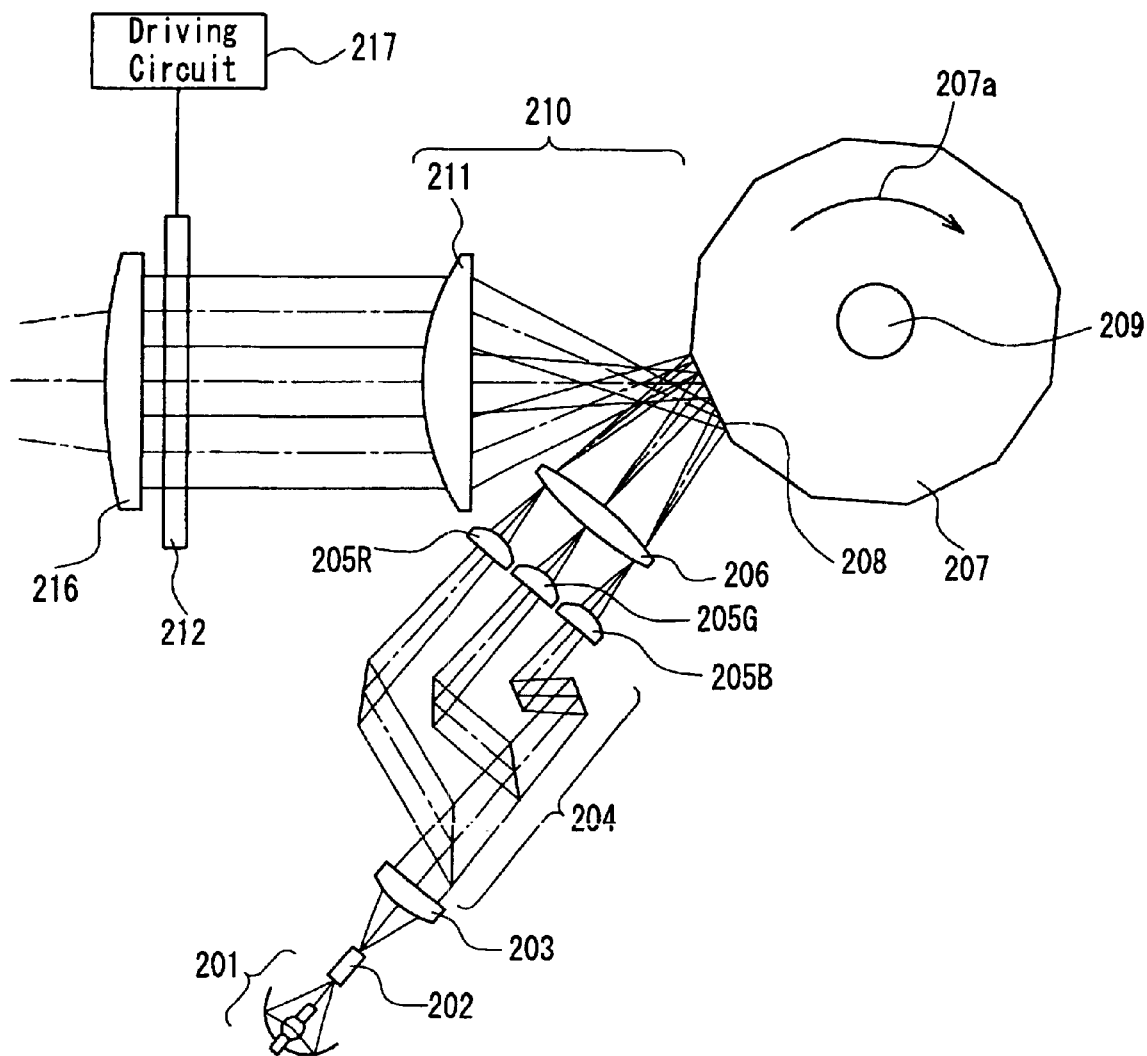
FIG. 1 is a schematic view showing a configuration of optical systems of a projection-type image display apparatus according to a first embodiment of the present invention.

A projection-type image display apparatus of the present invention displays a color image by using not a color filter but a light valve (an image display panel) having no pixel exclusively for a light beam of each color. This makes it possible to achieve a higher efficiency of light utilization and a higher resolution display. Furthermore, by constructing a scanning optical system with a rotating polygon mirror, a small image display apparatus can be provided.

Also, since optical paths of light beams of individual colors have equal lengths from a light source portion to the rotating polygon mirror, it is possible to display an image with enhanced color uniformity.

In the above-mentioned projection-type image display apparatus of the present invention, it is preferable that an effective portion of each of the respective light beams does not interfere with any of the mirrors for reflecting the light beams of the other colors, and optical axes of the respective light beams do not intersect with each other on the optical paths before the relay lens system.

Alternatively, it is preferable that an effective portion of at least one light beam out of the light beams reflected respectively by the first red-reflecting mirror, the first green-reflecting mirror and the first blue-reflecting mirror interferes with the first reflecting mirror arranged in a foregoing stage of the first reflecting mirror that has reflected the at least one light beam, an optical axis of each of the respective light beams intersects twice optical axes of the light beams of the other colors on the optical path before the relay lens system, and the first blue-reflecting mirror and the first green-reflecting mirror respectively are a blue-reflecting red/green-transmitting dichroic mirror and a blue/green-reflecting red-transmitting dichroic mirror, and the light beam from the white illumination optical system enters the blue-reflecting red/green-transmitting dichroic mirror and the blue/green-reflecting red-transmitting dichroic mirror in this order.

Alternatively, it is preferable that an effective portion of at least one light beam out of the light beams reflected respectively by the first red-reflecting mirror, the first green-reflecting mirror and the first blue-reflecting mirror interferes with the first reflecting mirror arranged in a foregoing stage of the first reflecting mirror that has reflected the at least one light beam or interferes with the second reflecting mirror for receiving the light beam reflected by the first reflecting mirror arranged in a subsequent stage of the first reflecting mirror that has reflected the at least one light beam, an optical axis of each of the respective light beams intersects four times optical axes of the light beams of the other colors on the optical path before the relay lens system, and the first red-reflecting mirror and the first green-reflecting mirror respectively are a red-reflecting green/blue-transmitting dichroic mirror and a red/green-reflecting blue-transmitting dichroic mirror, and the light beam from the white illumination optical system enters the red-reflecting green/blue-transmitting dichroic mirror and the red/green-reflecting blue-transmitting dichroic mirror in this order.

In the above-described projection-type image display apparatus of the present invention, it also is preferable that at least one dichroic filter for enhancing color purity is provided between the color separation optical system and the rotating polygon mirror.

Further, it is preferable that the white illumination optical system includes an integrator optical system for emitting a white light beam having a rectangular cross-section.

Moreover, it is preferable that the second optical system includes at least one fθ lens.

In addition, the image display panel may be a transmission-type light valve. Alternatively, the image display panel may be a reflection-type light valve.

The following is a specific description of the projection-type image display apparatus of the present invention, with reference to preferred embodiments.

(First Embodiment)

FIG. 1 is a schematic view showing a configuration of a projection-type image display apparatus of a first embodiment of the present invention. The projection-type image display apparatus includes a light source portion 201, a white illumination optical system having a rod integrator 202 and a first focusing lens 203, a color separation optical system 204, a relay lens system having second focusing lenses 205R, 205G and 205B provided for individual colors and a third focusing lens 206, a rotating polygon mirror 207, a second optical system 210 having a fθ lens 211, an image display panel 212, an image display panel driving circuit 217 and a projection optical system 216. The white illumination optical system, the color separation optical system 204 and the relay lens system constitute a first optical system. Also, the rotating polygon mirror 207 and the second optical system 210 constitute a scanning optical system.

A white light beam emitted from the light source portion 201 formed of a concave mirror and a lamp bulb enters the rod integrator 202, is reflected by its inner surface several times, becomes a white light beam with a substantially uniform intensity and a rectangular cross-section at a rectangular emitting-aperture portion of the rod integrator 202, and then reaches the first focusing lens 203. The first focusing lens 203 is optically designed such that the emitting-aperture portion of the rod integrator 202 is an object point and an incident surface of each of the second focusing lenses 205R, 205G and 205B for respective colors, which will be described later, is an image point. The light beam that has left the first focusing lens 203 is separated into red, green and blue light beams by the color separation optical system 204 (described more specifically later), and focused onto the second focusing lenses 205R, 205G and 205B, respectively. The focused light beams respectively form light source images on a reflecting surface 208 of the rotating polygon mirror 207 by the second focusing lenses 205R, 205G and 205B for respective colors and the third focusing lens 206, which are optically designed such that a virtual image of the emitting-aperture portion of the rod integrator 202 is formed on the reflecting surface 208 of the rotating polygon mirror 207.

Figure 2:
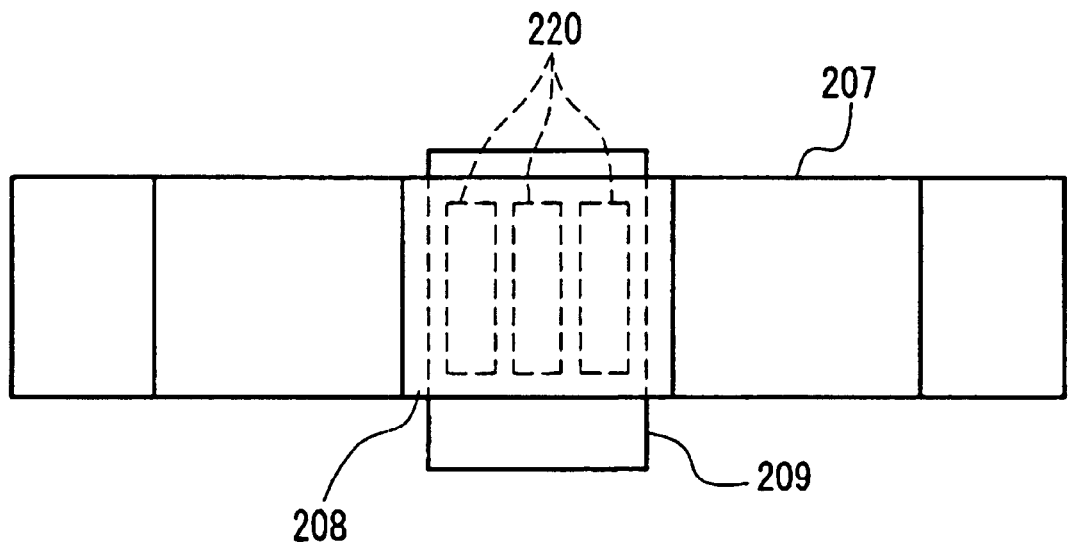
FIG. 2 is a front view showing light source images formed on a rotating polygon mirror of the projection-type image display apparatus shown in FIG. 1.

The rotating polygon mirror 207 is rotated continuously by a motor (not shown in this figure) about a rotation axis 209 in a direction indicated by an arrow 207a. As in FIG. 2, which shows one moment during the rotation of the rotating polygon mirror 207, rectangular groups (the above-mentioned light source images) 220 of red, blue and green lights are formed on one reflecting surface 208 so as to be aligned along a moving direction of the reflecting surface 208 such that they are not overlapped.

The light beams of the respective colors reflected by the reflecting surface 208 of the rotating polygon mirror 207 travel via the second optical system 210, reach the image display panel 212 and then are magnified and projected onto a screen (not shown in this figure) by the projection optical system (only partially shown) 216.

The color separation optical system 204 of the present embodiment will be described.

The light beam that has left the first focusing lens 203 is separated into red, green and blue light beams by the color separation optical system 204, and these light beams are focused such that optical images whose object points correspond to the emitting-aperture portion of the rod integrator 202 are formed on the respective surfaces of the second focusing lenses 205R, 205G and 205B. The angles of first dichroic mirrors and second dichroic mirrors constituting the color separation optical system 204 and the spaces between them are adjusted so that these optical images are formed on the same plane.

Figure 9:
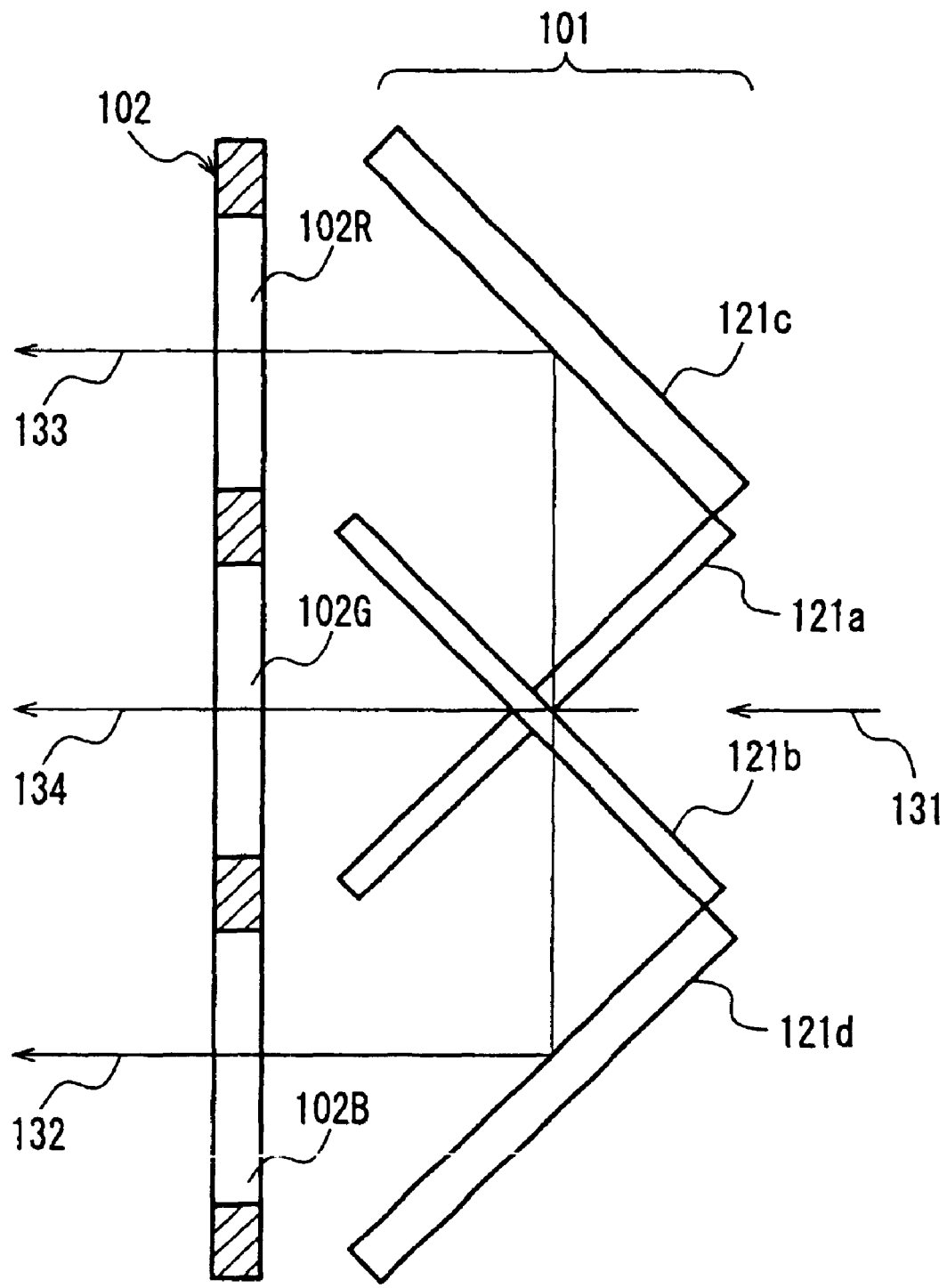
FIG. 9 is a sectional view showing details of a color separation optical system used in the projection-type image display apparatus shown in FIG. 8.

In the case where the conventional color separation optical system 101 as shown in FIG. 9 is provided in the subsequent stage of the first focusing lens 203, the optical images of the respective colors focused by the first focusing lens 203 and the color separation optical system 101 cannot be positioned on the same plane. This is because there is a difference between the optical path of the green light beam 134 transmitted by the dichroic mirrors 121a and 121b and the optical paths of the blue light beam 132 reflected by the dichroic mirror 121a and the total reflection mirror 121d and the red light beam reflected by the dichroic mirror 121b and the total reflection mirror 121c. In other words, the positions on which the green light beam and the blue and red light beams are focused by the third focusing lens 206 do not match. Accordingly, in order for the virtual image of the emitting-aperture portion of the rod integrator 202 for each color to be formed on the reflecting surface 208 of the rotating polygon mirror 207, there is no alternative but to adopt the configuration of two optical systems having a relay lens system including a second focusing lens for green light and a third focusing lens for green light and a relay lens system including second focusing lenses for blue and red lights and third focusing lenses for blue and red lights.

However, in the subsequent stage of the rotating polygon mirror 207, since it is necessary to constitute the second optical system 210 formed of the fθ lens 211 by one optical system so that a scanning angle of each light beam scanned by the rotating polygon mirror 207 and a height of an image formed on the image display panel 212 are proportional, the above-mentioned configuration of the two optical systems for the green light and the blue and red lights cannot be achieved. Thus, it is impossible to achieve a series of optical systems from the light source portion 201 to the image display panel 212 by using the conventional color separation optical system 101 as shown in FIG. 9.

Figure 3:
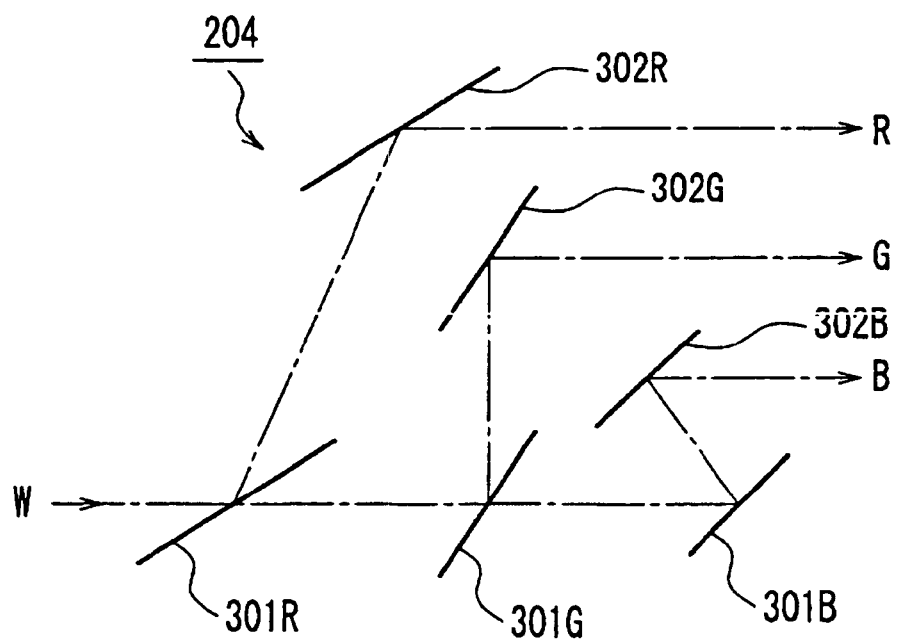
FIG. 3 is a schematic view showing a configuration of a color separation optical system of the projection-type image display apparatus according to the first embodiment of the present invention.

For the above reason, in the color separation optical system 204 in the first embodiment, as shown in FIG. 3, the angles of the first dichroic mirrors 301R, 301B and 301G and the second dichroic mirrors 302R, 302G and 302B constituting the color separation optical system 204 and the spaces between them are adjusted so that the optical paths of the respective colors have equal lengths from the light source portion 201 to the rotating polygon mirror 207, i.e., so that the optical images focused onto the surfaces of the second focusing lenses 205R, 205G and 205B are on the same plane. However, although the color separation optical system 204 is constituted so that the incident surfaces of the second focusing lenses 205R, 205G and 205B for individual colors are on the same plane in the present embodiment, the color separation optical system 204 also may be constituted so that emitting surfaces of the second focusing lenses 205R, 205G and 205B are on the same plane.

The following is a description of a specific arrangement and optical characteristics of the first dichroic mirrors 301R, 301B and 301G and the second dichroic mirrors 302R, 302G and 302B, with reference to FIG. 3. In FIG. 3, W, R, G and B indicate optical axes of a white light beam, a red light beam, a green light beam and a blue light beam, respectively.

The first dichroic mirror 301R, the first dichroic mirror 301G and the first dichroic mirror 301B are arranged in this order from the incident side of the white light beam that has left the first focusing lens 203.

The first dichroic mirror 301R is inclined by about 55° with respect to a plane perpendicular to the optical axis and has a function of reflecting red light and transmitting blue and green lights in the visible spectrum. The second dichroic mirror 302R that the light reflected by the first dichroic mirror 301R enters also has optical characteristics similar to the first dichroic mirror 301R and is arranged in parallel with the first dichroic mirror 301R.

Also, the first dichroic mirror 301G is inclined by about 30° with respect to a plane perpendicular to the optical axis and has a function of reflecting green light and transmitting blue light in the visible spectrum. The second dichroic mirror 302G that the light reflected by the first dichroic mirror 301G enters also has optical characteristics similar to the first dichroic mirror 301G and is arranged in parallel with the first dichroic mirror 301G.

Further, the first dichroic mirror 301B is inclined by about 45° with respect to a plane perpendicular to the optical axis and has a function of reflecting blue light in the visible spectrum. The second dichroic mirror 302B that the light reflected by the first dichroic mirror 301B enters also has optical characteristics similar to the first dichroic mirror 301B and is arranged in parallel with the first dichroic mirror 301B.

In addition, an effective portion of each of the light beams of three colors obtained by the color separation does not interfere with the first or second dichroic mirror for reflecting the light beams of the other colors. Here, the "effective portion" of the light beam refers to a portion in a light beam of each color that reaches an effective pixel region of the image display panel 212 and contributes to a color image formation. For example, in the case of a red light beam reflected sequentially by the first dichroic mirror 301R and the second dichroic mirror 302R, the effective portion of this red light beam does not interfere with any of the first dichroic mirror 301G and the second dichroic mirror 302G that reflect the green light beam and the first dichroic mirror 301B and the second dichroic mirror 302B that reflect the blue light beam. Similarly, the effective portion of the green light beam does not interfere with any of the first dichroic mirror 301R and the second dichroic mirror 302R that reflect the red light beam and the first dichroic mirror 301B and the second dichroic mirror 302B that reflect the blue light beam. Also, the effective portion of the blue light beam does not interfere with any of the first dichroic mirror 301R and the second dichroic mirror 302R that reflect the red light beam and the first dichroic mirror 301G and the second dichroic mirror 302G that reflect the green light beam.

Moreover, the optical axes of these light beams do not intersect with each other on the optical paths before reaching the second focusing lenses 205R, 205G and 205B for the individual colors. In other words, as shown in FIG. 3 seen in a direction normal to a plane including the optical axes of these light beams, the optical axis R of the red light, the optical axis G of the green light and the optical axis B of the blue light do not intersect with each other.

As long as the effective portion of a light beam of each color does not interfere with any of the first and second dichroic mirrors for reflecting the light beams of the other colors and the optical axes of these light beams do not intersect with each other, the angles of the first and second dichroic mirrors and the spaces between them are not limited to the above example.

Also, the optical characteristics regarding reflection/transmission of the first dichroic mirrors and the second dichroic mirrors are not limited to the above example, and several kinds of combinations are possible. In order to reduce costs, a configuration in which no problem arises in the optical characteristics of the emitted light beams of individual colors may be adopted; for example, the first dichroic mirror 301B and the second dichroic mirrors 302R, 302G and 302B may be replaced with total reflection mirrors.

Furthermore, for the purpose of achieving an excellent color purity of each light beam, a dichroic filter may be inserted on the optical path between the color separation optical system 204 and the rotating polygon mirror 207. Such a dichroic filter may be provided as an independent member or by applying a coating having a dichroic filter function to the surface of the second focusing lens for each light beam.

Next, when the rotating polygon mirror 207 is rotated, how a reflected light changes in the reflecting surface 208 and how the light beams of individual colors entering the image display panel 212 are scanned will be described by way of FIGS. 6A to 6F.

FIGS. 6A to 6F show the rotation of the rotating polygon mirror 207 and an accompanying change in the state of the image display panel 212 illuminated by the light beams of individual colors at a fixed time interval. In the figures showing the illumination states of the image display panel 212 located above, R, G and B represent regions illuminated by the red light, the green light and the blue light, respectively. In the figures showing the rotation of the rotating polygon mirror 207 and reflection states of the light beams of individual colors located below, R, G and B indicate chief rays of red light, green light and blue light respectively, and arrows indicate the traveling directions of these rays.

At time T=t1 (see FIG. 6A), the light beams of red, green and blue enter the same reflecting surface 208a of the rotating polygon mirror 207. At this time, the incident angles of the blue, green and red light beams to the reflecting surface 208a (the angles that the chief rays of the incident light beams form with the normal line of the reflecting surface 208a) decrease in this order. Thus, the blue light beam is reflected at the largest angle toward the top of the drawing, the green light beam is reflected at a slightly smaller angle than the blue light beam, and the red light beam is reflected at a still smaller angle than the green light beam. Accordingly, the light beams of these colors enter the fθ lens 211 of the second optical system 210 at different angles from each other. In the second optical system 210, a height of a light beam at an illumination position (the image display panel 212) is determined depending on the incident angle of the light beam. Therefore, the light beams of the respective colors form images of the second focusing lenses 205R, 205G and 205B at different positions on the image display panel 212 as indicated by the figure. In other words, the region illuminated by the blue light, the region illuminated by the green light and the region illuminated by the red light are formed on the image display panel 212 in this order from the top.

At time T=t2 (see FIG. 6B), which is the time the rotating polygon mirror 207 has been rotated by a predetermined angle from the position at time T=t1, the red light beam and the green light beam enter the same reflecting surface 208a of the rotating polygon mirror 207, while the blue light beam enters a reflecting surface 208b that has just arrived at this entering position. At this time, with respect to the blue light beam in particular, since the incident angle of this light beam into the reflecting surface changes considerably from the state at time T=t1, its reflection direction also changes considerably. Accordingly, the green light beam is reflected at the largest angle toward the top of the drawing, the red light beam is reflected at a slightly smaller angle than the green light beam, and the blue light beam is reflected at a still smaller angle than the red light beam. Therefore, the light beams of the respective colors form images of the second focusing lenses 205R, 205G and 205B at different positions on the image display panel 212 as indicated by the figure. In other words, the region illuminated by the green light, the region illuminated by the red light and the region illuminated by the blue light are formed on the image display panel 212 in this order from the top.

At time T=t3 (see FIG. 6C), which is the time the rotating polygon mirror 207 has been further rotated by a predetermined angle from the position at time T=t2, only the red light beam enters the reflecting surface 208a, while the green light beam and the blue light beam enter the same reflecting surface 208b. At this time, with respect to the green light beam in particular, since the incident angle of this light beam into the reflecting surface changes considerably from the state at time T=t2, its reflection direction also changes considerably. Accordingly, the red light beam is reflected at the largest angle toward the top of the drawing, the blue light beam is reflected at a slightly smaller angle than the red light beam, and the green light beam is reflected at a still smaller angle than the blue light beam. Therefore, the light beams of the respective colors form images of the second focusing lenses 205R, 205G and 205B at different positions on the image display panel 212 as indicated by the figure. In other words, the region illuminated by the red light, the region illuminated by the blue light and the region illuminated by the green light are formed on the image display panel 212 in this order from the top.

At time T=t4 (see FIG. 6D), which is the time the rotating polygon mirror 207 has been further rotated by a predetermined angle from the position at time T=t3, the light beams of red, green and blue enter the same reflecting surface 208b. At this time, the positional relationship is the same as that at time T=t1 (see FIG. 6A), and the state of the image display panel 212 illuminated by the light beams of these colors also is the same.

At time T=t5 (see FIG. 6E), which is the time the rotating polygon mirror 207 has been further rotated by a predetermined angle, the red light beam and the green light beam enter the same reflecting surface 208b, while the blue light beam enters a reflecting surface 208c that has just arrived at this entering position. At this time, the positional relationship is the same as that at time T=t2 (see FIG. 6B), and the state of the image display panel 212 illuminated by the light beams of these colors also is the same.

At time T=t6 (see FIG. 6F), which is the time the rotating polygon mirror 207 has been further rotated by a predetermined angle, the red light beam enters the reflecting surface 208b, while the green light beam and the blue light beam enter the same reflecting surface 208c. At this time, the positional relationship is the same as that at time T=t3 (see FIG. 6C), and the state of the image display panel 212 illuminated by the light beams of these colors also is the same.

As described above, the belt-like regions illuminated by the light beams of red, green and blue that are formed on the image display panel 212 move sequentially in a scanning direction 212a. Although FIGS. 6A to 6F showed only the specific period (time T=t1 to t6) in the above description, because of a continuous rotation of the rotating polygon mirror 207, each of the regions illuminated by the light beams of the individual colors moves (is scanned) on the image display panel 212 continuously upward (in the scanning direction 212a). When the region illuminated by the light beam reaches the upper end, it returns to the lower end and moves upward again. A continuous switching of the times t1 to t6 described above at an even time interval allows an illumination with enhanced color uniformity and brightness uniformity and reduced flicker.

The second optical system 210 is formed of an optical system having a function of the fθ lens and that of changing the magnification for forming an appropriate illuminated region on the image display panel 212.

Figure 7:
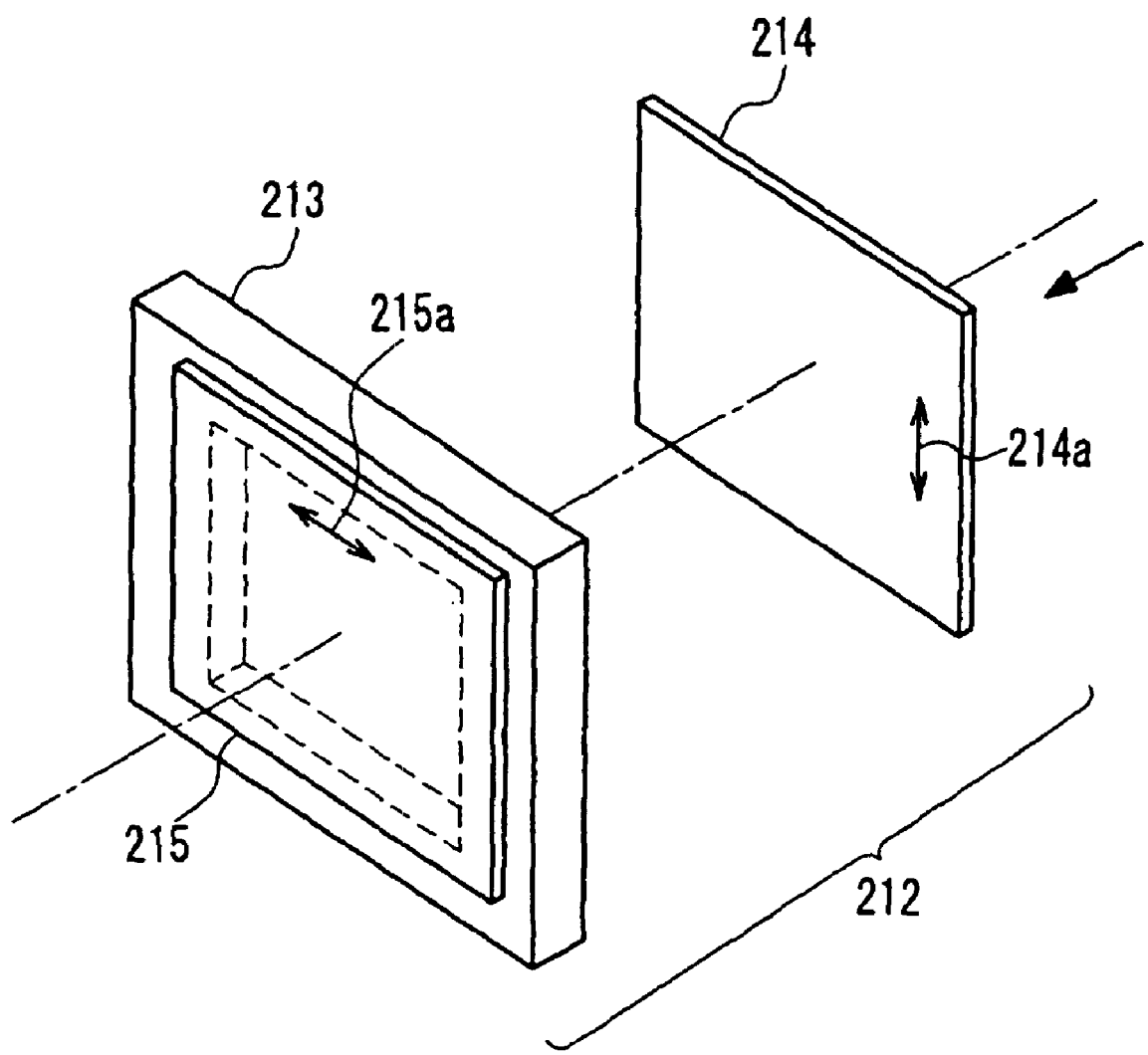
FIG. 7 is an exploded perspective view showing a configuration of a transmission-type image display panel used in the projection-type image display apparatus shown in FIG. 1.
Figure 8:
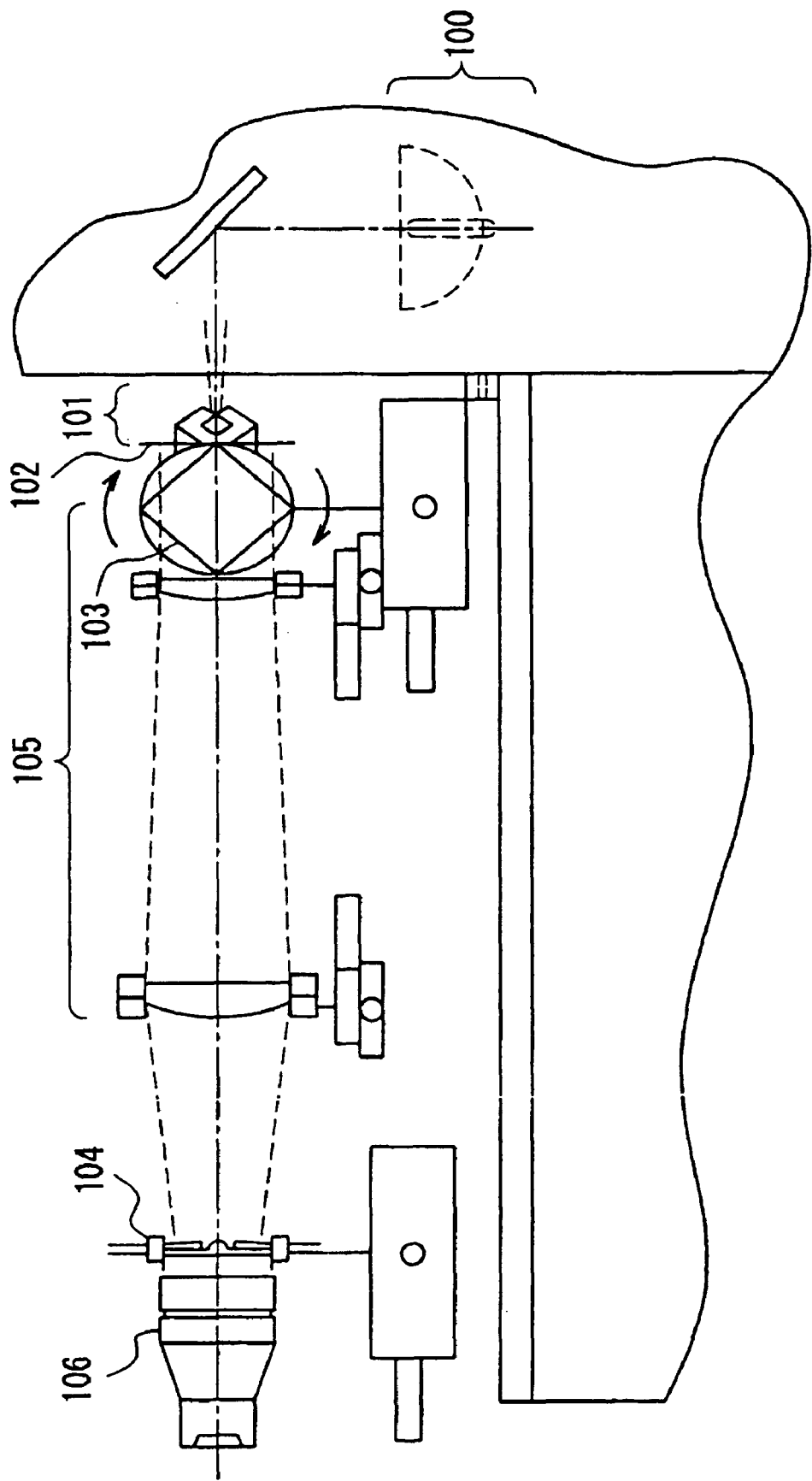
FIG. 8 is a schematic view showing a configuration of a conventional single-plate projection-type image display apparatus using a scanning optical system.

As shown in FIG. 7, the image display panel 212 includes a transmission-type liquid crystal panel 213, an entrance-side polarizing plate 214 as a polarizer provided on the entrance-side and an exit-side polarizing plate 215 as an analyzer provided on the exit side. The entrance-side polarizing plate 214 is designed, for example, to transmit light polarized in a shorter side direction 214a of its rectangular outline and to absorb light polarized in a direction orthogonal thereto. The light transmitted by the entrance-side polarizing plate 214 enters the liquid crystal panel 213. The liquid crystal panel 213 has many pixels formed and arranged therein and is capable of changing the polarization direction of the transmitted light at every pixel aperture by an external signal. In this configuration, the liquid crystal panel 213 transmits the incident light while rotating its polarization direction by 90° when the pixels are not driven, whereas it transmits the incident light without changing the polarization direction when the pixels are driven. The exit-side polarizing plate 215 has polarization characteristics in a direction orthogonal to the entrance-side polarizing plate 214. In other words, the exit-side polarizing plate 215 has a transmission axis in a longer side direction 215a of its rectangular outline and transmits light polarized in this direction. Thus, the light that has entered an undriven pixel of the liquid crystal panel 213 and been transmitted with its polarization direction rotated by 90° can pass through this exit-side polarizing plate 215 because it is polarized in a direction parallel to the transmission axis of the exit-side polarizing plate 215. On the other hand, the light that has entered a driven pixel of the liquid crystal panel 213 and been transmitted without being subjected to the change in its polarization direction is absorbed by this exit-side polarizing plate 215 because it is polarized in a direction orthogonal to the transmission axis of the exit-side polarizing plate 215.

The image display panel driving circuit 217 drives each pixel of the liquid crystal panel 213 of the image display panel 212 by a signal corresponding to the color of light illuminating this pixel. In this manner, an image is formed by modulating the light at every pixel. The light transmitted by the image display panel 212 is projected into a screen (not shown in this figure) via a projection optical system 216. Since the scannings of the light beams of the individual colors shown in FIGS. 6A to 6F are carried out at a high speed (it is preferable that one unit consisting of FIGS. 6A to 6F is carried out at least once within one field period), images of individual colors are synthesized so as to be perceived by a retina of an observer as a color image that does not look separate.

As described above, the light beams of individual colors are made to enter the rotating polygon mirror 207 at different incident angles and different incident positions, and the reflected light beams are led to the image display panel 212 via the second optical system having the fθ lens function, making it possible to display a color image even when using one image display panel 212 that has no color selection member such as a color filter and no pixel provided exclusively for a light beam of each color. In addition, since each pixel of the image display panel 213 displays the image according to the color of light illuminating this pixel, a high resolution display can be achieved. Furthermore, since the light from the light source portion 201 always is led to the image display panel 212 effectively, it is possible to achieve a highly efficient light utilization.

Moreover, by constituting the optical system so as to obtain smaller light source images on the reflecting surface 208 of the rotating polygon mirror, the area of the reflecting surface 208 can be made smaller. Accordingly, it becomes possible to reduce the size of the rotating polygon mirror 207, allowing a smaller motor for rotating this rotating polygon mirror. As a result, it becomes possible to reduce the size, weight and cost of the entire apparatus.

In addition, since the color separation optical system 204 is constituted such that the optical paths of the light beams of individual colors have equal lengths from the light source portion 201 to the rotating polygon mirror 207, a color image with enhanced color uniformity can be displayed.

(Second Embodiment)

Figure 4:
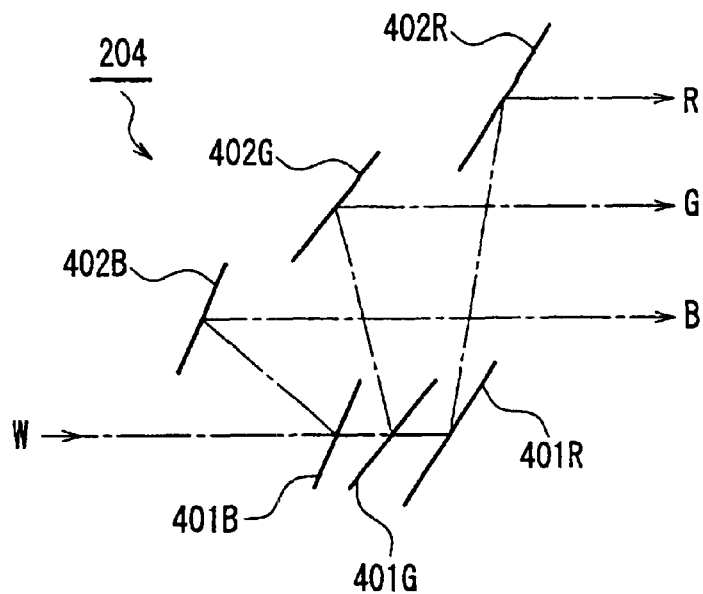
FIG. 4 is a schematic view showing a configuration of a color separation optical system of a projection-type image display apparatus according to a second embodiment of the present invention.

FIG. 4 shows a schematic configuration of the color separation optical system 204 according to the present embodiment. In FIG. 4, W, R, G and B indicate optical axes of a white light beam, a red light beam, a green light beam and a blue light beam, respectively. The present embodiment is different from the first embodiment in the following two points.

First, a part of the effective portion of a light beam reflected by a first dichroic mirror 401G interferes with a first dichroic mirror 401B arranged in the foregoing stage (on the incident side of the white light beam) of the first dichroic mirror 401G. Also, a part of the effective portion of a light beam reflected by a first dichroic mirror 401R interferes with the first dichroic mirror 401G arranged in the foregoing stage of the first dichroic mirror 401R.

Second, the optical axis of a light beam of each color intersects twice the optical axes of light beams of the other colors on the optical path before the second focusing lens 205R, 205G or 205B.

In the present embodiment, the above-described configuration especially makes it possible to reduce the area in which the three first dichroic mirrors are arranged. As a result, the area that the configuration of the color separation optical system 204 occupies can be made compact, down to about two-thirds of that in the first embodiment. However, the optical characteristics thereof are limited. The following is a description of the present embodiment, in particular, the color separation optical system 204.

The first dichroic mirror 401B, the first dichroic mirror 401G and the first dichroic mirror 401R are arranged in this order from the incident side of the white light beam that has left the first focusing lens 203.

The first dichroic mirror 401B is inclined by about 20° with respect to a plane perpendicular to the optical axis and has a function of reflecting blue light and transmitting green and red lights in the visible spectrum. A second dichroic mirror 402B that the light reflected by the first dichroic mirror 401B enters also has optical characteristics similar to the first dichroic mirror 401B and is arranged in parallel with the first dichroic mirror 401B.

Also, the first dichroic mirror 401G is inclined by about 40° with respect to a plane perpendicular to the optical axis and has a function of reflecting green light and transmitting red light in the visible spectrum. A second dichroic mirror 402G that the light reflected by the first dichroic mirror 401G enters also has optical characteristics similar to the first dichroic mirror 401G and is arranged in parallel with the first dichroic mirror 401G.

Further, the first dichroic mirror 401R is inclined by about 35° with respect to a plane perpendicular to the optical axis and has a function of reflecting red light in the visible spectrum. A second dichroic mirror 402R that the light reflected by the first dichroic mirror 401R enters also has optical characteristics similar to the first dichroic mirror 401R and is arranged in parallel with the first dichroic mirror 401R.

Here, the blue light beam reflected by the first dichroic mirror 401B is reflected by the second dichroic mirror 402B in a similar manner, and then directed toward the second focusing lens 205B. Among the light beams transmitted by the first dichroic mirror 401B, the green light beam is reflected by the first dichroic mirror 401G and directed toward the second dichroic mirror 402G. On the way, a part of the effective portion of this green light beam directed toward the second dichroic mirror 402G interferes with the first dichroic mirror 401B. However, since the first dichroic mirror 401B has optical characteristics of shifting its spectral characteristics indicating reflection or transmission on a shorter wavelength side when an incident angle of a light beam (here, the incident angle refers to an angle that an incident light beam forms with a plane perpendicular to the dichroic mirror) increases, the green light beam entering the first dichroic mirror 401B from its back surface is not completely blocked although the interfering portion of this light beam decreases by less than about 10% corresponding to transmittance of the first dichroic mirror 401B.

Similarly, the red light beam transmitted by the first dichroic mirror 401G is reflected by the first dichroic mirror 401R and directed toward the second dichroic mirror 402R. On the way, a part of the effective portion of this red light beam directed toward the second dichroic mirror 402R interferes with the first dichroic mirror 401G. However, since the first dichroic mirror 401G has optical characteristics of shifting its spectral characteristics indicating reflection or transmission on a shorter wavelength side when an incident angle of a light beam (here, the incident angle refers to an angle that an incident light beam forms with a plane perpendicular to the dichroic mirror) increases, the red light beam entering the first dichroic mirror 401G from its back surface is not completely blocked although the interfering portion of this light beam decreases by less than about 10% corresponding to transmittance of the first dichroic mirror 401G.

Furthermore, in the present embodiment, the optical axis of a light beam of each color intersects twice the optical axes of light beams of the other colors on the optical path before reaching the second focusing lens 205R, 205G or 205B for each color. In other words, as shown in FIG. 4 seen in a direction normal to a plane including the optical axes of these light beams, the optical axis R of the red light, the optical axis G of the green light and the optical axis B of the blue light each intersects once the optical axis of each of the light beams of the other colors (twice in total).

Moreover, as in the first embodiment, the angles of the dichroic mirrors and the spaces between them are adjusted such that the optical paths of the light beams of individual colors have equal lengths from the light source portion 201 to the rotating polygon mirror 207.

In the present embodiment, the effective portion of a light beam of one color reflected by the first dichroic mirror interferes with the first dichroic mirror for reflecting the light beam of the other color arranged in the foregoing stage (on the incident side of the white light beam W) of the first dichroic mirror that has reflected the light beam of that color. Furthermore, the optical axis of a light beam of each color intersects twice the optical axes of light beams of the other colors on the optical path before reaching the second focusing lens 205R, 205G or 205B. Although it is necessary to adjust the angles of the first and second dichroic mirrors and the spaces between them for achieving the above configuration, the angles of the first and second dichroic mirrors and the spaces between them are not limited to the above example.

Also, the optical characteristics regarding reflection/transmission of the first dichroic mirrors and the second dichroic mirrors are not limited to the above example, and several kinds of combinations are possible. In order to reduce costs, a configuration in which no problem arises in the optical characteristics of the emitted light beams of individual colors may be adopted; for example, the first dichroic mirror 401R and the second dichroic mirrors 402B, 402G and 402R may be replaced with total reflection mirrors.

Furthermore, for the purpose of achieving an excellent color purity of each light beam, a dichroic filter may be inserted on the optical path between the color separation optical system 204 and the rotating polygon mirror 207. Such a dichroic filter may be provided as an independent member or by applying a coating having a dichroic filter function to the surface of the second focusing lens for each light beam.

Except for the configuration of the color separation optical system 204 being different as described above, a projection-type image display apparatus of the present embodiment can be constituted in a similar manner as in the first embodiment.

According to the present embodiment, it is possible to provide a projection-type image display apparatus having characteristics similar to those of the first embodiment. Moreover, the present embodiment can provide a smaller projection-type image display apparatus than the first embodiment.

(Third Embodiment)

Figure 5:
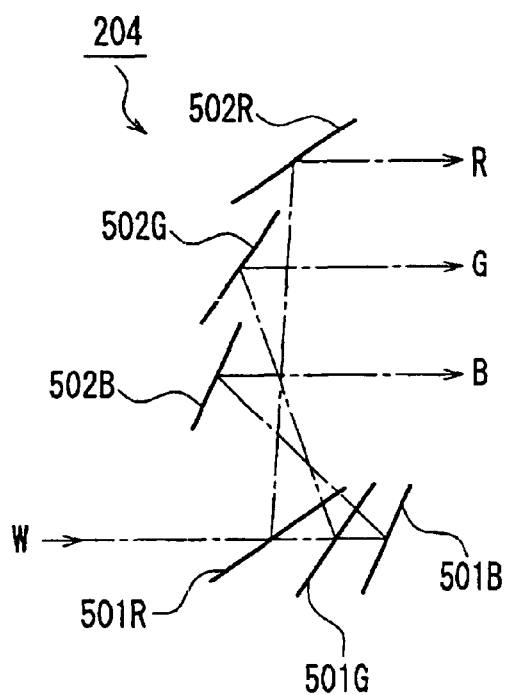
FIG. 5 is a schematic view showing a configuration of a color separation optical system of a projection-type image display apparatus according to a third embodiment of the present invention.
Figures 6A, 6B, 6C, 6D, 6E, 6F:
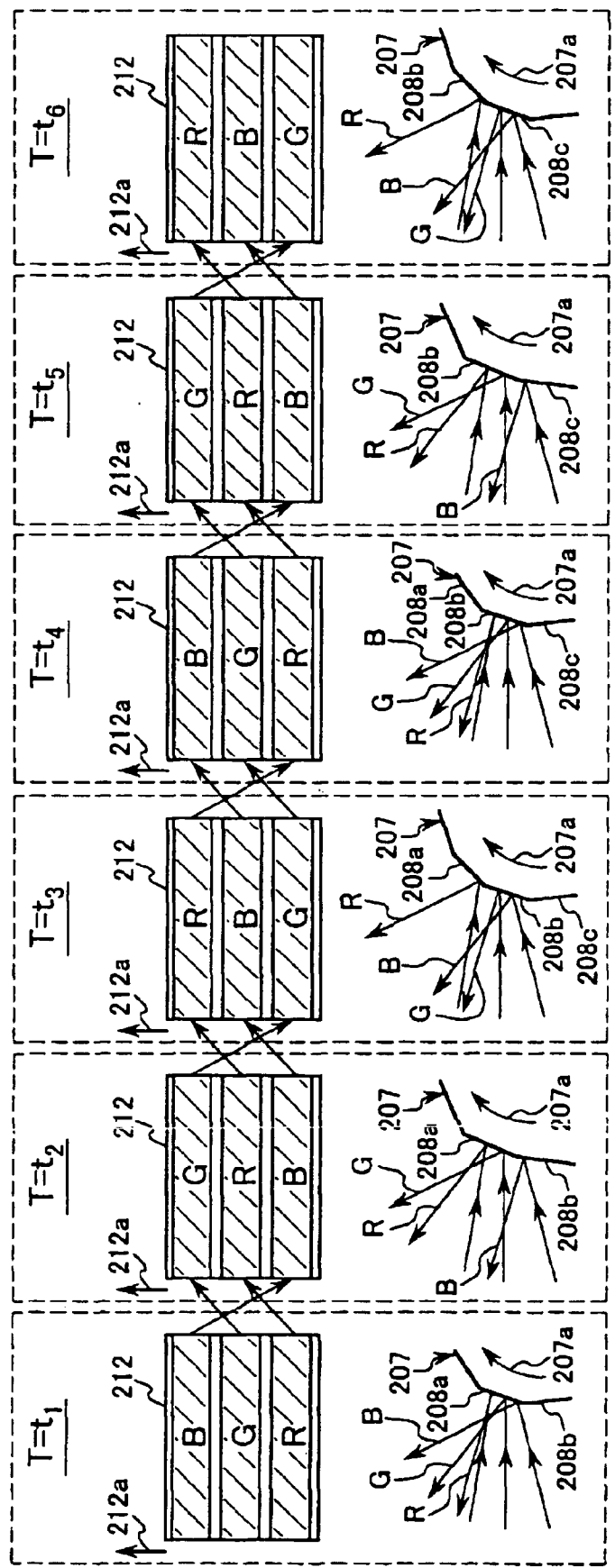
FIGS. 6A to 6F are drawings showing how light reflected by the rotating polygon mirror changes and how light beams of individual colors illuminating an image display panel are scanned in the projection-type image display apparatus shown in FIG. 1.

FIG. 5 shows a schematic configuration of the color separation optical system 204 according to the present embodiment. In FIG. 5, W, R, G and B indicate optical axes of a white light beam, a red light beam, a green light beam and a blue light beam, respectively. The present embodiment is different from the first embodiment in the following two points.

First, a part of the effective portion of a light beam reflected by a first dichroic mirror 501R interferes with a second dichroic mirror 502G. Also, a part of the effective portion of a light beam reflected by a first dichroic mirror 501G interferes with the first dichroic mirror 501R arranged in the foregoing stage (on the incident side of the white light beam) of the first dichroic mirror 501G and interferes with the second dichroic mirror 502B. Further, a part of the effective portion of a light beam reflected by a first dichroic mirror 501B interferes with the first dichroic mirrors 501R and 501G arranged in the foregoing stage of the first dichroic mirror 501B.

Second, the optical axis of a light beam of each color intersects four times the optical axes of light beams of the other colors on the optical path before the second focusing lens 205R, 205G or 205B.

In the present embodiment, the above-described configuration makes it possible to reduce both the area in which the three first dichroic mirrors are arranged and the area in which the three second dichroic mirrors are arranged. As a result, the area that the configuration of the color separation optical system 204 occupies can be made compact, down to about half of that in the first embodiment. However, the optical characteristics thereof are limited. The following is a description of the present embodiment, in particular, the color separation optical system 204.

The first dichroic mirror 501R, the first dichroic mirror 501G and the first dichroic mirror 501B are arranged in this order from the incident side of the white light beam that has left the first focusing lens 203.

The first dichroic mirror 501R is inclined by about 55° with respect to a plane perpendicular to the optical axis and has a function of reflecting red light and transmitting green and blue lights in the visible spectrum. A second dichroic mirror 502R that the light reflected by the first dichroic mirror 501R enters also has optical characteristics similar to the first dichroic mirror 501R and is arranged in parallel with the first dichroic mirror 501R.

Also, the first dichroic mirror 501G is inclined by about 35° with respect to a plane perpendicular to the optical axis and has a function of reflecting green light and transmitting blue light in the visible spectrum. A second dichroic mirror 502G that the light reflected by the first dichroic mirror 501G enters also has optical characteristics similar to the first dichroic mirror 501G and is arranged in parallel with the first dichroic mirror 501G.

Further, the first dichroic mirror 501B is inclined by about 20° with respect to a plane perpendicular to the optical axis and has a function of reflecting blue light in the visible spectrum. A second dichroic mirror 502B that the light reflected by the first dichroic mirror 501B enters also has optical characteristics similar to the first dichroic mirror 501B and is arranged in parallel with the first dichroic mirror 501B.

Here, the red light beam reflected by the first dichroic mirror 501R is reflected by the second dichroic mirror 502R in a similar manner, and then directed toward the second focusing lens 205R. On the way, a part of the effective portion of the red light beam directed toward the second dichroic mirror 502R interferes with the second dichroic mirror 502G. However, since the second dichroic mirror 502G has optical characteristics of shifting its spectral characteristics indicating reflection or transmission on a shorter wavelength side when an incident angle of a light beam (here, the incident angle refers to an angle that an incident light beam forms with a plane perpendicular to the dichroic mirror) increases, the red light beam entering the second dichroic mirror 502G is not completely blocked although the interfering portion of this light beam decreases by less than about 10% corresponding to transmittance of the second dichroic mirror 502G.

Among the light beams transmitted by the first dichroic mirror 501R, the green light beam is reflected by the first dichroic mirror 501G and directed toward the second dichroic mirror 502G. On the way, a part of the effective portion of this green light beam directed toward the second dichroic mirror 502G interferes with the first dichroic mirror 501R and the second dichroic mirror 502B. However, since the first dichroic mirror 501R has optical characteristics of shifting its spectral characteristics indicating reflection or transmission on a longer wavelength side when an incident angle of a light beam (here, the incident angle refers to an angle that an incident light beam forms with a plane perpendicular to the dichroic mirror) decreases, the green light beam entering the first dichroic mirror 501R from its back surface is not completely blocked although the interfering portion of this light beam decreases by less than about 10% corresponding to transmittance of the first dichroic mirror 501R. Also, since the second dichroic mirror 502B has optical characteristics of shifting its spectral characteristics indicating reflection or transmission on a shorter wavelength side when an incident angle of a light beam (here, the incident angle refers to an angle that an incident light beam forms with a plane perpendicular to the dichroic mirror) increases, the green light beam entering the second dichroic mirror 502B is not completely blocked although the interfering portion of this light beam decreases by less than about 10% corresponding to transmittance of the second dichroic mirror 502B.

Moreover, the blue light beam transmitted by the first dichroic mirror 501G is reflected by the first dichroic mirror 501B and directed toward the second dichroic mirror 502B. On the way, a part of the effective portion of this blue light beam directed toward the second dichroic mirror 502B interferes with the first dichroic mirrors 501G and 501R. However, since the first dichroic mirrors 501G and 501R have optical characteristics of shifting their spectral characteristics indicating reflection or transmission on a longer wavelength side when an incident angle of a light beam (here, the incident angle refers to an angle that an incident light beam forms with a plane perpendicular to the dichroic mirror) decreases, the blue light beam entering the first dichroic mirrors 501G and 501R from their back surfaces is not completely blocked although the interfering portion of this light beam decreases by less than about 10% corresponding to transmittances of the first dichroic mirrors 501G and 501R.

Furthermore, in the present embodiment, the optical axis of a light beam of each color intersects four times the optical axes of light beams of the other colors on the optical path before the second focusing lens 205R, 205G or 205B for each color. In other words, as shown in FIG. 5 seen in a direction normal to a plane including the optical axes of these light beams, the optical axis R of the red light, the optical axis G of the green light and the optical axis B of the blue light each intersects twice the optical axis of each of the light beams of the other colors (four times in total).

Moreover, as in the first embodiment, the angles of the dichroic mirrors and the spaces between them are adjusted such that the optical paths of the light beams of individual colors have equal lengths from the light source portion 201 to the rotating polygon mirror 207.

In the present embodiment, the effective portion of a light beam of one color reflected by the first dichroic mirror interferes with the first dichroic mirrors for reflecting the light beam of the other colors arranged in the foregoing stage (on the incident side of the white light beam W) of the first dichroic mirror that has reflected the light beam of that color. Alternatively, the effective portion of a light beam of one color reflected by the first dichroic mirror interferes with the second dichroic mirror for receiving the light beam of the other color reflected by the first dichroic mirror arranged in the subsequent stage (on the side opposite to the incident side of the white light beam W) of the first dichroic mirror that has reflected the light beam of that color. Furthermore, the optical axis of a light beam of each color intersects four times the optical axes of light beams of the other colors on the optical path before the second focusing lens 205R, 205G or 205B. Although it is necessary to adjust the angles of the first and second dichroic mirrors and the spaces between them for achieving the above configuration, the angles of the first and second dichroic mirrors and the spaces between them are not limited to the above example.

Also, the optical characteristics regarding reflection/transmission of the first dichroic mirrors and the second dichroic mirrors are not limited to the above example, and several kinds of combinations are possible. In order to reduce costs, a configuration in which no problem arises in the optical characteristics of the emitted light beams of individual colors may be adopted; for example, the first dichroic mirror 501B and the second dichroic mirror 502R may be replaced with total reflection mirrors.

Furthermore, for the purpose of achieving an excellent color purity of each light beam, a dichroic filter may be inserted on the optical path between the color separation optical system 204 and the rotating polygon mirror 207. Such a dichroic filter may be provided as an independent member or by applying a coating having a dichroic filter function to the surface of the second focusing lens for each light beam.

Except for the configuration of the color separation optical system 204 being different as described above, a projection-type image display apparatus of the present embodiment can be constituted in a similar manner as in the first embodiment.

According to the present embodiment, it is possible to provide a projection-type image display apparatus having characteristics similar to those of the first embodiment. Moreover, the present embodiment can provide a smaller projection-type image display apparatus than not only the first embodiment but also the second embodiment.

Although a transmission-type liquid crystal system display device was used as the image display panel 212 in the above embodiments, any device is appropriate as long as it is a display device that displays an image by modulating an incident light. Thus, it also is possible to use a reflection-type liquid crystal system, a reflection-type mirror device or the like. Needless to say, it has to be a display device capable of fast response.

In addition, although the above embodiments were directed to an example of using the rod integrator 202 having a rectangular emitting aperture as the integrator optical system, the present invention is not limited to this as long as a uniform white illumination light beam having a rectangular cross-section can be emitted. For example, it may be possible to use an integrator optical system having a first microlens array, which is a group of microlenses having identically-shaped rectangular apertures, and a second lens array, which is a group of microlenses in a one-to-one correspondence with the microlenses of the first lens array.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A projection-type image display apparatus, comprising:

a light source portion for emitting a white light beam;

a first optical system comprising
- a white illumination optical system that the white light beam from the light source portion enters and that emits a uniform white illumination light beam having a rectangular cross-section,
- a color separation optical system for separating the white illumination light beam into respective light beams of red, green and blue, and
- a relay lens system that the respective light beams obtained by a color separation enter;

a rotating polygon mirror that the respective light beams having left the relay lens system enter and that scans the respective light beams while reflecting the respective light beams;

a second optical system for leading the respective light beams reflected by the rotating polygon mirror to an illumination position;

an image display panel that is arranged at the illumination position and provided with many pixels for modulating an incident light according to a color signal of red, green or blue;

an image display panel driving circuit for driving each of the pixels of the image display panel by a signal corresponding to a color of light entering this pixel; and a projection optical system for magnifying and projecting an image of the image display panel;

wherein the color separation optical system comprises first and second red-reflecting mirrors that reflect at least the red light beam, first and second green-reflecting mirrors that reflect at least the green light beam, and first and second blue-reflecting mirrors that reflect at least the blue light beam, and the mirrors are arranged so that optical paths of the respective light beams have equal lengths from the light source portion to the rotating polygon mirror.

2. The projection-type image display apparatus according to claim 1, wherein an effective portion of each of the respective light beams does not interfere with any of the mirrors for reflecting the light beams of the other colors, and optical axes of the respective light beams do not intersect with each other on the optical paths before reaching the relay lens system.

3. The projection-type image display apparatus according to claim 1, wherein an effective portion of at least one light beam out of the light beams reflected respectively by the first red-reflecting mirror, the first green-reflecting mirror and the first blue-reflecting mirror interferes with the first reflecting mirror arranged in a foregoing stage of the first reflecting mirror that has reflected the at least one light beam, an optical axis of each of the respective light beams intersects twice optical axes of the light beams of the other colors on the optical path before the relay lens system, and the first blue-reflecting mirror and the first green-reflecting mirror respectively are a blue-reflecting red/green-transmitting dichroic mirror and a blue/green-reflecting red-transmitting dichroic mirror, and the light beam from the white illumination optical system enters the blue-reflecting red/green-transmitting dichroic mirror and the blue/green-reflecting red-transmitting dichroic mirror in this order.

4. The projection-type image display apparatus according to claim 1, wherein an effective portion of at least one light beam out of the light beams reflected respectively by the first red-reflecting mirror, the first green-reflecting mirror and the first blue-reflecting mirror interferes with the first reflecting mirror arranged in a foregoing stage of the first reflecting mirror that has reflected the at least one light beam or interferes with the second reflecting mirror for receiving the light beam reflected by the first reflecting mirror arranged in a subsequent stage of the first reflecting mirror that has reflected the at least one light beam, an optical axis of each of the respective light beams intersects four times optical axes of the light beams of the other colors on the optical path before the relay lens system, and the first red-reflecting mirror and the first green-reflecting mirror respectively are a red-reflecting green/blue-transmitting dichroic mirror and a red/green-reflecting blue-transmitting dichroic mirror, and the light beam from the white illumination optical system enters the red-reflecting green/blue-transmitting dichroic mirror and the red/green-reflecting blue-transmitting dichroic mirror in this order.

5. The projection-type image display apparatus according to claim 1, wherein at least one dichroic filter for enhancing color purity is provided between the color separation optical system and the rotating polygon mirror.

6. The projection-type image display apparatus according to claim 1, wherein the white illumination optical system comprises an integrator optical system for emitting a white light beam having a rectangular cross-section.

7. The projection-type image display apparatus according to claim 1, wherein the second optical system comprises at least one fθ lens.

8. The projection-type image display apparatus according to claim 1, wherein the image display panel is a transmission-type light valve.

9. The projection-type image display apparatus according to claim 1, wherein the image display panel is a reflection-type light valve.

* * * * *